(12) United States Patent
Guchhait

(10) Patent No.: US 7,324,607 B2
(45) Date of Patent: Jan. 29, 2008

(54) METHOD AND APPARATUS FOR PATH SEARCHING

(75) Inventor: Atanu Guchhait, West Bengal (IN)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 10/608,129

(22) Filed: Jun. 30, 2003

(65) Prior Publication Data
US 2004/0266357 A1 Dec. 30, 2004

(51) Int. Cl.
*H03K 9/00* (2006.01)
(52) U.S. Cl. ...................................... 375/316
(58) Field of Classification Search ............... 375/316, 375/343, 147; 701/215, 207; 704/205, 268
See application file for complete search history.

(56) References Cited

U.S. PATENT DOCUMENTS

| 7,095,813 B2 * | 8/2006 | Amerga et al. ............. 375/343 |
| 7,184,951 B2 * | 2/2007 | Royle et al. ................ 704/205 |
| 2001/0014114 A1 * | 8/2001 | Baltersee et al. ........... 375/148 |

OTHER PUBLICATIONS

R. Hamila et al., "Novel Technique for Closely-Spaced Multipath Delay Estimation in DS-CDMA Systems", Submitted to Signal Processing Journal (EURASIP), May 2001, http://www.cs.tut.fi/~ridha/Ridha_Hamila_PhD_TUT.pdf, Publication 7, pp. 125-144.

* cited by examiner

*Primary Examiner*—Khai Tran
(74) *Attorney, Agent, or Firm*—Pearl Cohen Zedek Latzer, LLP

(57) ABSTRACT

Embodiments of the present invention provide a method, apparatus and system for path searching, including computing a set of slope-normalized operator values corresponding to a set of respective signal samples.

40 Claims, 6 Drawing Sheets

US 7,324,607 B2

METHOD AND APPARATUS FOR PATH SEARCHING

BACKGROUND OF THE INVENTION

The Wideband Code Division Multiple Access (WCDMA) protocol is used by wireless communications systems, for example, third generation (3G) cellular mobile communication systems.

A WCDMA device may include a Rake receiver to receive signals from many multi-paths and to combine the received signals into a combined signal.

The Rake receiver may include a path searcher, which may use a set of signal samples to select a pre-determined number of dominant paths. The efficiency of the Rake receiver may depend on the selection of dominant paths and on a calculation of time delays for the dominant paths, e.g., a more accurate selection of dominant paths and more accurate calculation of time delays will result in higher Signal to Interference Noise Ratio (SINR).

In some conventional systems, the Rake receiver may use a Delay Locked Loop (DLL) to adjust synchronization of each of the dominant paths with a sub-chip resolution, $T_c/8$, wherein $T_c$ is the chip period. In conventional path searchers, some dominant paths, for example, strong paths having relatively high amplitudes, may be undesirably ignored by the path searcher and may, thus, remain undetected. This may result in a lower efficiency, e.g., lower SINR. Other disadvantages of some conventional path searchers include a time shift of the detected paths, a relatively low and/or constant sub-chip level resolution of the delay of multi-paths, lack of information regarding path amplitude and/or time delay of selected paths. Additionally, some prior art path searchers involve complex hardware implementation.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
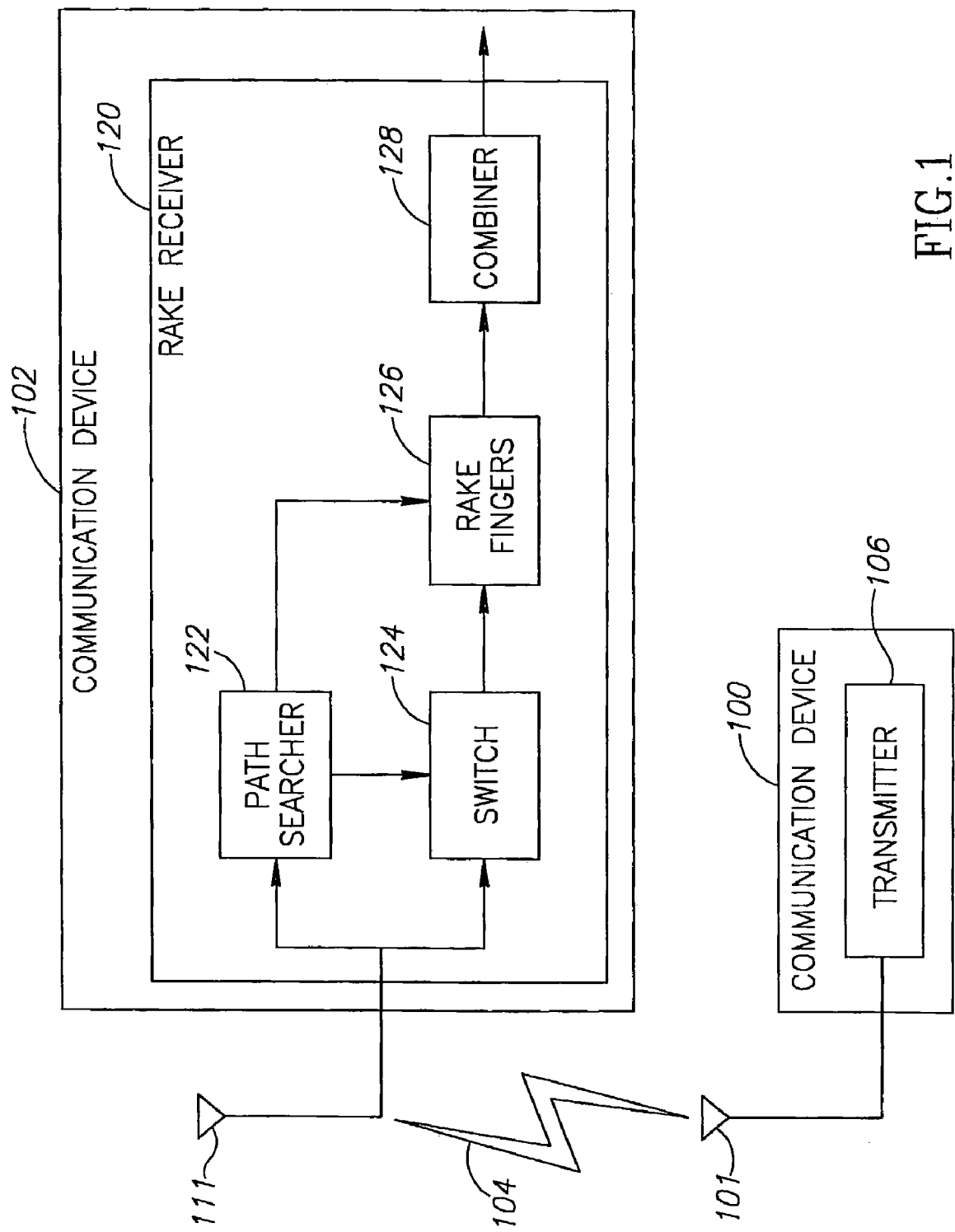
FIG. 1 is a simplified block diagram of a communication system in accordance with some exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that embodiments of the present invention may be used in a variety of applications. Although the scope of the present invention is not limited in this respect, the circuits and techniques disclosed herein may be used in many apparatuses such as receivers of a radio system. Receivers intended to be included within the scope of the present invention include, by a way of example only, cellular radiotelephone receivers, spread spectrum receivers, digital system receivers and the like.

Types of cellular radiotelephone receivers intended to be within the scope of the present invention include, although not limited to, Code Division Multiple Access (CDMA), CDMA 2000 and wideband CDMA (WCDMA) cellular radiotelephone, receivers for receiving spread spectrum signals, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), wide area network (WAN), or a global communication network, for example, the Internet.

Reference is made to FIG. 1, which schematically illustrates an exemplary communication system in accordance with some embodiments of the present invention, enabling a first communication device 100 to communicate with a second communication device 102 over a communication channel 104.

Although the scope of the present invention is not limited in this respect, communication devices 100, 102 may include wireless modems of computers and communication channel 104 may be part of a WAN or a LAN. For example, the system may be a wireless LAN (WLAN) system. Alternatively, although the scope of the present invention is not limited in this respect, the communication system shown in FIG. 1 may be part of a cellular communication system, with one of communication devices 100, 102 being a base station and the other a mobile station or with both communication devices 100, 102 being mobile stations, a pager communication system, a personal digital assistant (PDA) and a server, etc. In such cases, although the scope of the present invention is in no way limited in this respect, communication device 100 may include a radio frequency antenna 101, and communication device 102 may include a plurality of radio frequency antennas 111, as is known in the art. In the case of a cellular wireless communication system, according to some embodiments of the invention, the communication system shown in FIG. 1 may be a $3^{rd}$ Generation Partnership Project (3GPP), such as, for example, Frequency Domain Duplexing (FDD), Wideband Code Division Multiple Access (WCDMA) cellular system and the like.

Communication device 100 may include a transmitter 106 to transmit a signal, as is known in the art. Communication device 102 may include a Rake receiver 120, which may include a path searcher 122, as described in detail below. Rake receiver may also include a switch 124, a plurality of Rake fingers 126, and a combiner 128, as are known in the art.

In some embodiments, receiver 120 and transmitter 106 may be implemented, for example, using separate and/or integrated units, for example, using a transmitter-receiver or a transceiver.

Figure 2A:
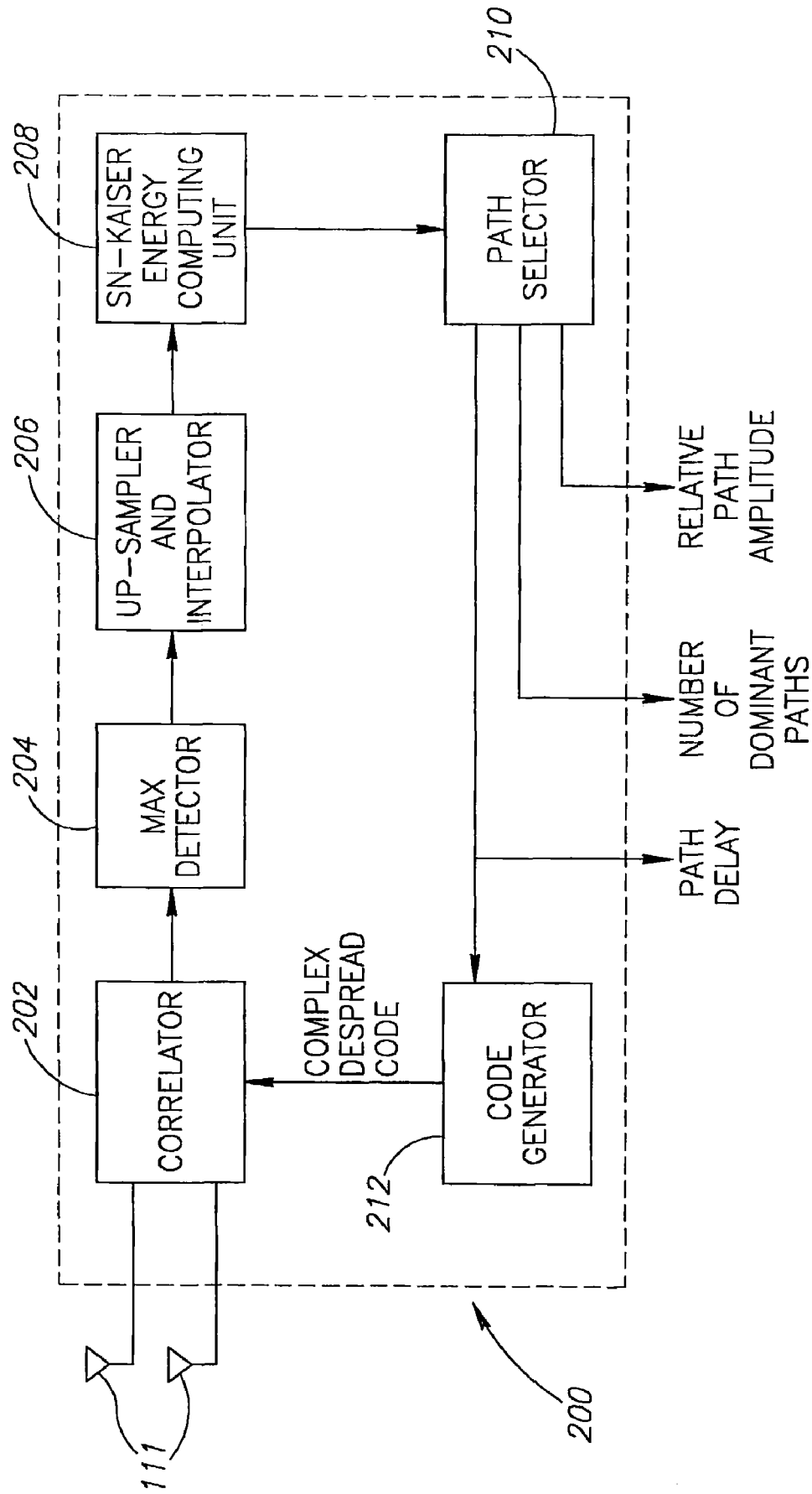
FIG. 2A is a schematic block diagram of a path searcher according to some exemplary embodiments of the invention.

FIG. 2A schematically illustrates a block diagram of a path searcher 200 according to some exemplary embodiments of the invention.

According to some embodiments of the invention, path searcher 200 may include a correlator 202, a signal value detector 204, an up-sampler 206, a Slope-Normalized (SN) computing unit 208, a path selector 210, and a code generator 212.

According to some embodiments of the invention, correlator 202 may be used to calculate a Power Delay Profile (PDP) of the input signals. The PDP may be based on a correlation between input signals received from antennas 111 and a code received from code generator 212, as described below. The PDP may include a received set including m received signals, x(m), corresponding to the input signals.

According to some embodiments of the invention, detector 204 may probe the received signals to detect a maximum value, $x_{max}$, of the received signals. The detection of $x_{max}$ may be accomplished using any method known in the art. For example, the following algorithm may be used:

$$xmax = x(1);$$
$$\text{for } i := 2 \text{ to } m \text{ do}$$
$$\text{begin}$$
$$value := x(i)$$
$$\text{if } value > xmax \text{ then } xmax := value;$$
$$end; \quad (1)$$

According to some embodiments of the invention, up-sampler 206 may have an up-sampling factor, f. The up-sampler may use the m received signals to calculate (f−1)*m additional signals and to provide a sample set including n sampled signals, x(n), wherein n equals f*m. The sample set may include the m received signals and the (f−1)*m calculated signals. For example, if m equals 18 and f equals 3, then n may equal 54 and the sample set may include 36 additional calculated signals. In order to calculate the additional signals, the up-sampler may include an interpolator. The interpolator may use any interpolation method known in the art, for example, linear interpolation. The set of sampled signals provided by the up-sampler may have a sample sub-chip level resolution of $T_c/f^3$, wherein $1/T_c$ is the chip rate. Thus, the sample sub-chip level resolution may be substantially equal to at least the sub-chip level resolution of the received set, as described below.

According to some embodiments of the invention, computing unit 208 may calculate a set of SN operator values, e.g. SN Kaiser energy operator values, $\Psi(n)$, corresponding to a set of sampled signals, x(n), respectively, as described below.

According to some embodiments of the invention, selector 210 may receive the SN operator values and select a plurality of dominant paths, for example, by selecting the paths corresponding to SN operator values, which are higher than a pre-determined threshold value. Alternatively or additionally, the selector may select a predetermined number of paths corresponding to the highest SN values. The selector may also provide dominant path information including a number of dominant paths, L, relative path amplitude, and a path delay of each of the dominant paths, respectively, as described below. The dominant path information may be implemented by Rake receiver 120 (FIG. 1) to combine the received signals using methods known in the art. For example, the time delays calculated by the path searcher may be used by Rake receiver 120 (FIG. 1) to offset an output of at least some of Rake fingers 126 (FIG. 1), such that combiner 128 (FIG. 1) may provide a combined signal including a combination of the signals received through the dominant paths.

According to embodiments of the invention, code generator 212 may generate a code to control correlator 202, e.g., according to the dominant path delays provided by the detection unit. The code generator may use the path delays provided by selector 210 to generate a set of pseudo-random codes, synchronized to respective dominant paths, as is known in the art.

Figure 2B:
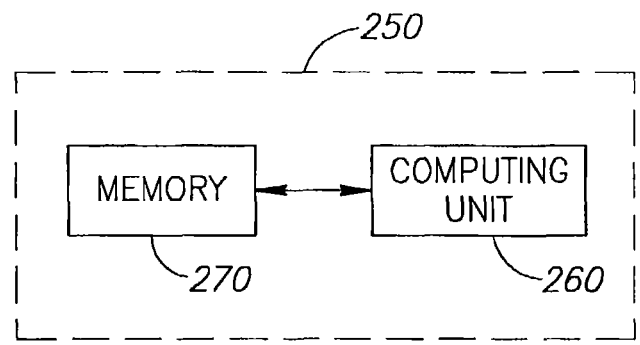
FIG. 2B is a simplified block diagram of a device in accordance with some exemplary embodiments of the present invention.

Reference is also made to FIG. 2B, which conceptually illustrates a device or unit 250 to perform functions in accordance with some exemplary embodiments of the present invention.

According to some exemplary embodiments of the invention, one or more of path searcher 200, correlator 202, signal value detector 204, up-sampler 206, SN computing unit 208, path selector 210, and/or code generator 212 may be implemented in a unit or a number of units similar to unit 250, which may include a computing unit 260 and a memory 270 coupled to computing unit 260. Although the scope of the present invention is not limited in this respect, computing unit 260 may include an application specific integrated circuit (ASIC), a reduced instruction set circuit (RISC), a digital signal processor (DSP) or a central processing unit (CPU). The specific type of computing unit 260 and the specific number of units that may be used to implement at least some of the functions described herein may depend on specific implementations and/or design requirements. Instructions to enable computing unit 260 to perform methods according to embodiments of the present invention may be stored in memory 270.

A Teager Energy Operator (TEO), $\psi_c(x(t))$, as a function of a value, $x(t)$, of the input signal at time t, may be calculated, for example, using the following equation:

$$\Psi_c(x(t)) = \left(\frac{d}{dt}x(t)\right)^2 - x(t)\left(\frac{d^2}{dt^2}x(t)\right) \quad (2)$$

A Teager-Kaiser operator, $\psi(x(n))$, as a function of sample, $x(n)$, may be derived using Equation 2, for example, to yield the following equation:

$$\Psi(x(n)) = x^2(n) - x(n+1)x(n-1) \quad (3)$$

For a complex signal, Equation 3 may be rewritten as follows:

$$\psi(n) = [x_c(n)*x(n) - \tfrac{1}{2}[x_c(n+1)*x(n-1) + x(n+1)*x_c(n-1)]] \quad (4)$$

wherein $x_c(n)$ denotes a complex component of $x(n)$.

Embodiments of the invention, as described in detail below, may improve at least one aspect of the dominant paths selected in comparison to methods and/or devices as are known in the art. These improvements may include, for example, preventing loss of peaks corresponding to dominant paths, preventing a time shift of the selected paths, providing a higher sub-chip level resolution, providing a significantly less complex hardware implementation, and/or providing information regarding the amplitude and/or the time delay of the selected paths. These benefits and advantages of the invention will be apparent to a person of ordinary skill in the art in view of the descriptions herein.

Using a derivation of Equation 4, $\psi(x(n))$ may be calculated by substituting n with (n−1) in the right hand side of equation 4. This may yield the following equation:

$$\Psi_1(x(n)) = x(n-1)*x_c(n-1) - \tfrac{1}{2}(x(n-2)*x_c(n) + x(n)*x_c(n-2)) \quad (5)$$

Equation 5 assigns the operator value, $\psi(x(n-1))$ of sample n−1 to the value of sample n, i.e. the operator values of Equation 5 are time-shifted by one sample.

Figure 3:
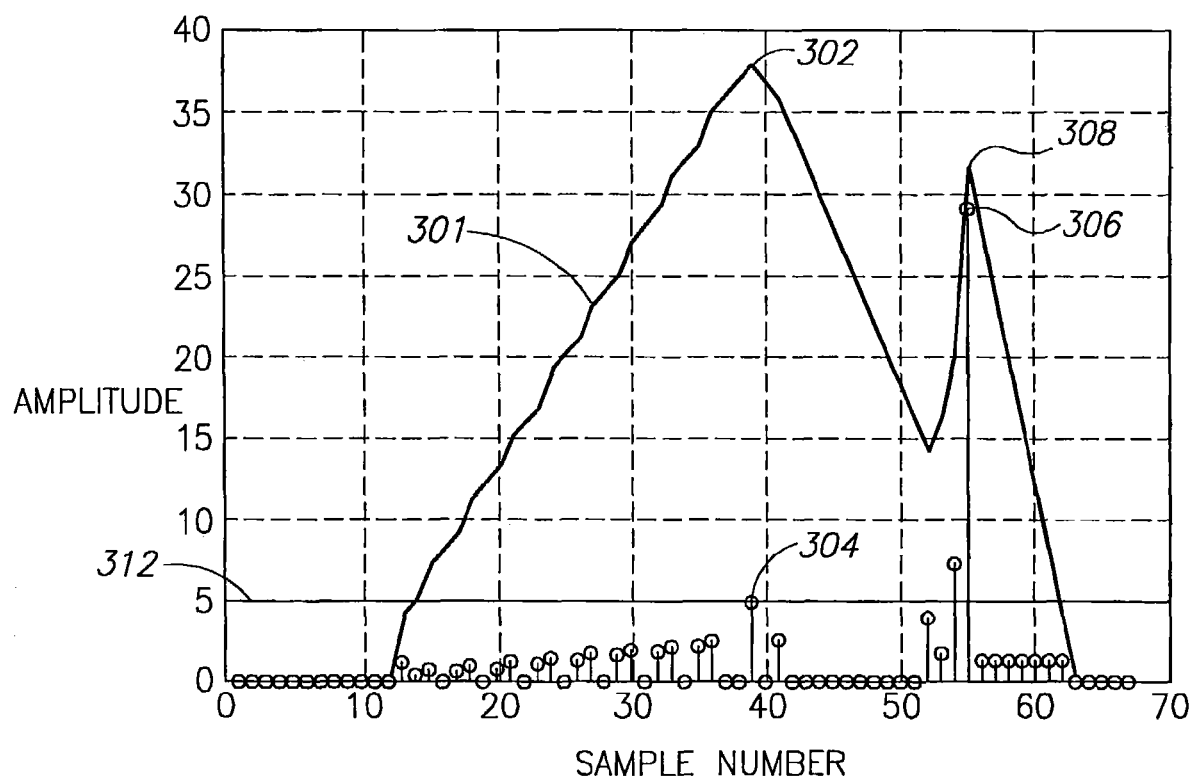
FIG. 3 is a schematic illustration of a graph depicting values of a Teager-Kaiser operator as a function of signal sample number.

FIG. 3 schematically illustrates a graph depicting values of the Teager-Kaiser operator of Equation 5 as a function of signal sample number.

According to some embodiments of the invention, $\psi_1(x(n))$ values calculated using Equation 5, may be generally dependent on a slope of the input signal PDP, which slope may relate to a difference between a corresponding pair of samples, for example, between $x(n-1)$ and $x(n+1)$. Furthermore, the $\psi_1(x(n))$ values calculated using Equation 5, may not be proportional to the amplitude of the corresponding signal samples. As shown in FIG. 3, although a first local peak 302 of a PDP 301 may be higher than a second local peak 308 of the PDP, a value 304 of the operator of Equation 5 corresponding to peak 302 may be significantly lower than a value 306 of the operator of Equation 5 corresponding to peak 308. In some scenarios, the dominant paths may be selected according to the operator values that are higher than a threshold value, e.g. value 312. Certain dominant paths, corresponding to a local PDP peak, and having a relatively shallow slope, e.g., a relatively small first order derivative may not be selected over less dominant paths. For example, a high local peak of PDP 301, e.g., local peak 302, may be lost, while a relatively low local peak, e.g., peak 308, having an operator value higher than the threshold value, e.g. value 306, may be selected. This result may not be desirable. Furthermore, the dominant paths selected according to Equation 5 may be time-shifted, e.g. by one sample, relative to the original paths, as described above, and may require adjustment, e.g. by shifting the output of the SN computing unit by one sample.

According to exemplary embodiments of the invention, the slope dependency of Equation 3 and Equation 4, as described above, may be corrected using a SN factor, $SN_{factor}$. The SN factor may be calculated, for example, using the following equation:

$$SN_{factor} = \frac{|x(n)|/|x_{\max}|}{\sqrt{\operatorname{abs}(|x(n-1)| - |x(n+1)|)}} \quad (6)$$

wherein the $\|$ operation denotes a modulus operation.

According to some embodiments of the invention, the denominator of Equation 6 may include a non-linear slope-normalizing factor to normalize Equation 3 and Equation 4 relative to a change, e.g., a slope, between samples $x(n-1)$ and $x(n+1)$. Thus, each of the values calculated with an operator, e.g. a Kaiser operator, using the SN factor may be substantially independent of a relationship between sample values of a corresponding pair of the signal samples, as described above. The numerator of Equation 6 may include an amplitude-normalizing factor to provide a SN operator value generally proportional to the amplitude of the corresponding sample, as described below. Thus, different SN operator values calculated using the $SN_{factor}$ may be relatively high or low according to the corresponding local slope and/or local amplitude of the PDP. For example, the $SN_{factor}$ may be inversely proportional to the local slope and proportional to the local amplitude of the PDP.

Thus, according to some exemplary embodiments of the invention, a SN Kaiser operator, $\Psi(n)$, may be calculated using an algorithm, which may be derived from Equations 3 and 6, as follows:

if $(x(n-1) - x(n+1)) = 0$ $$\psi(n) = ((x(n)/x_{max}))*[x(n)*x(n) - x(n+1)*x(n-1)] \quad (7)$$

else $$\psi(n) = SN_{factor} * [x(n)*x(n) - x(n+1)*x(n-1)]$$

According to some embodiments of the invention, for a complex signal, Algorithm 7 may be rewritten as follows:

if $(|x(n-1)|-|x(n+1)|)=0$       (8)

Figure 4:
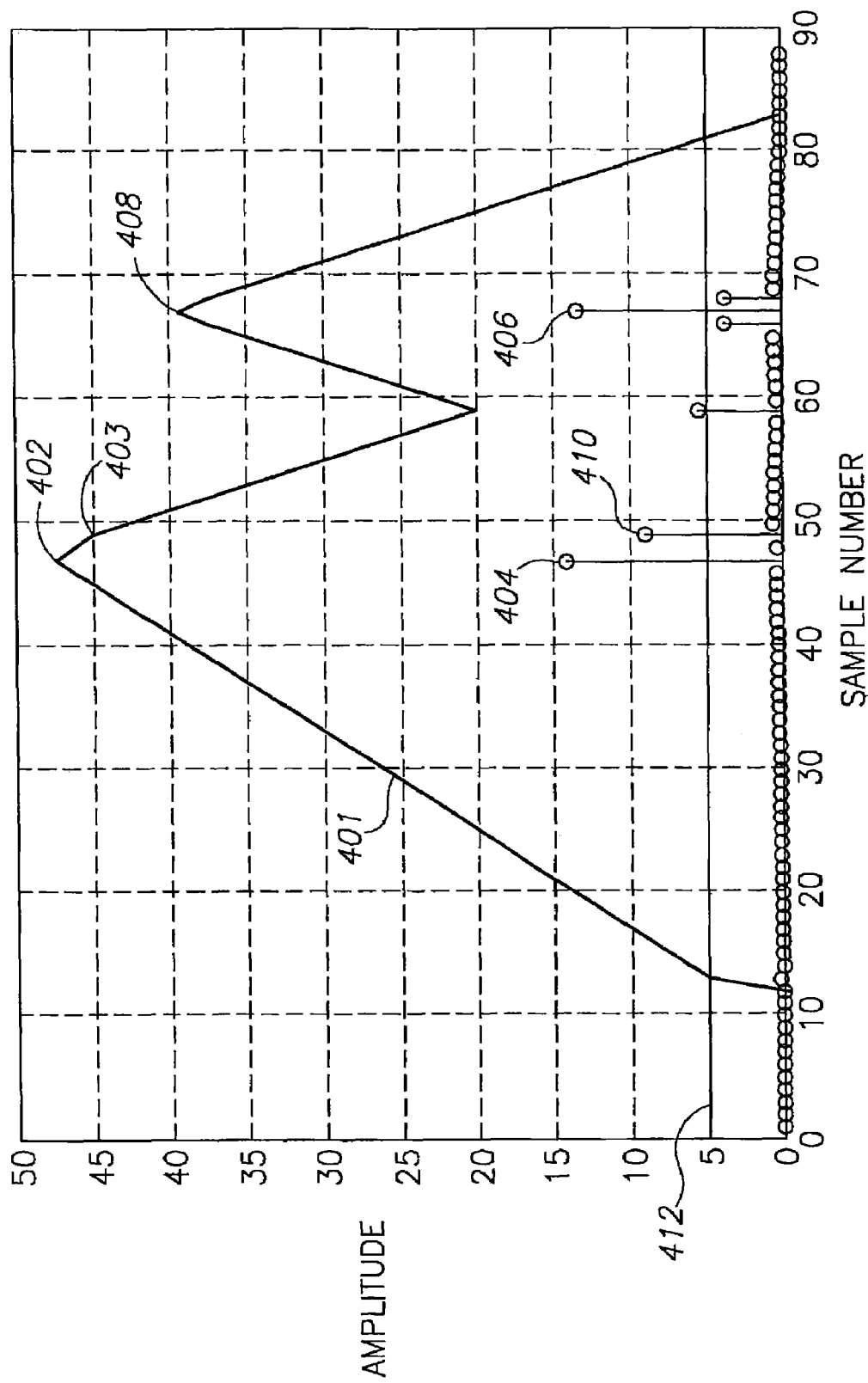
FIG. 4 is a schematic illustration of a graph depicting values of a Slope Normalized (SN) Kaiser operator as a function of signal sample number, according to some exemplary embodiments of the invention.

$\psi(n)=((|x(n)|/|x_{max}|))*[x_c(n)*x(n)-\frac{1}{2}[x_c(n+1)*x(n-1)+x(n+1)*x_c(n-1)]]$ else $\psi(n)=SN_{factor}*[x_c(n)*x(n)-\frac{1}{2}[x_c(n+1)*x(n-1)+x(n+1)*x_c(n-1)]]]$ FIG. 4 schematically illustrates a graph depicting values of the SN Kaiser operator of Algorithm 8 as a function of sample number, according to exemplary embodiments of the invention.

The exemplary values of the SN Kaiser operator illustrated in FIG. 4 include up-sampling by a factor of three of the received signals, as described herein.

As shown in FIG. 4, sample numbers 47, 49 and 67 may have SN Kaiser values 404, 410 and 406, corresponding to local peaks 402, 403, and 408, respectively. Thus, three dominant paths may be chosen corresponding to sample numbers 47, 49, and 67, as described above. As may be noted, although the slope of local peak 402 is relatively small, value 404 is substantially higher than a threshold value that may be used, for example, threshold 412. Thus, by using $SN_{factor}$ calculation according to exemplary embodiments of the invention local peak 402 is not lost. This desired result is an improvement over the calculation used in FIG. 3 above, wherein local peak 302 (FIG. 3) is lost when the conventional Kaiser operator is used. It may also be noted that the position of the dominant paths is generally not shifted relative to the sample number, i.e., the SN Kaiser values representing the dominant paths, e.g., values 404, 410 and 406, generally correspond to the sample numbers of the dominant paths.

Figure 5:
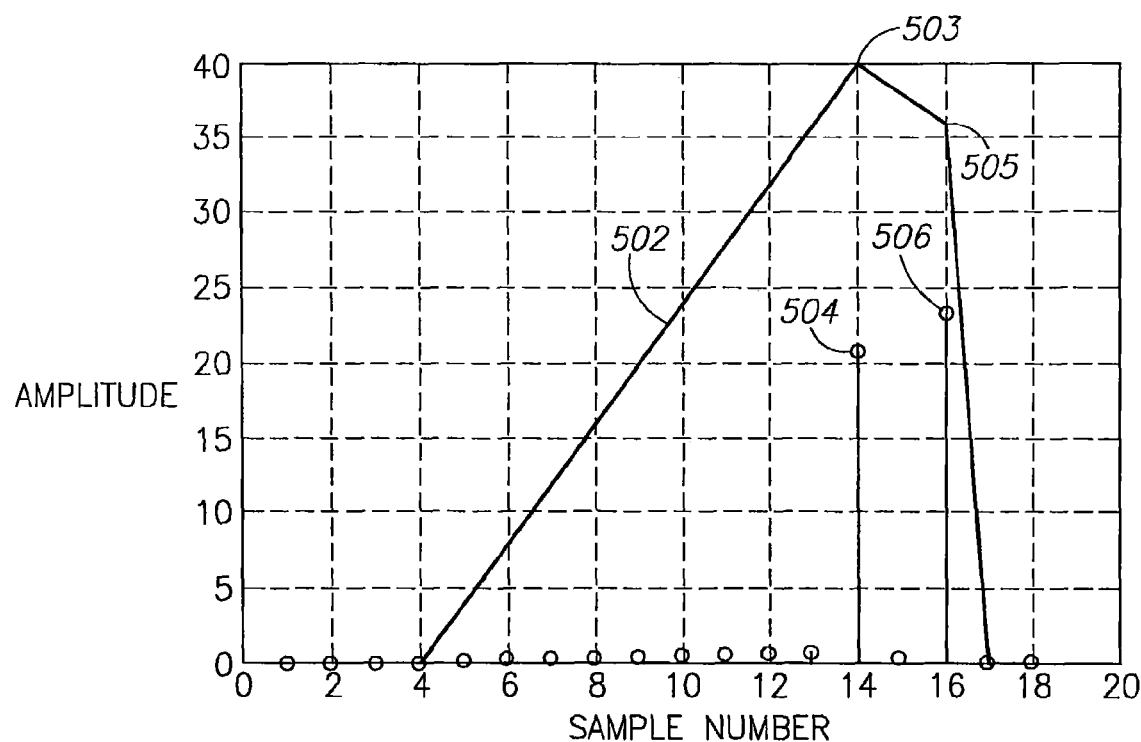
FIG. 5 is a schematic illustration of a graph depicting amplitude of a Power Delay Profile (PDP) and values of a SN Kaiser operator as a function of sample number, respectively, in accordance with an exemplary embodiment of the invention.

Reference is made to FIG. 5, which schematically illustrates a graph depicting amplitude of a PDP 502 and values of a SN Kaiser operator as a function of signal sample number, respectively, in accordance with an exemplary embodiment of the invention.

According to exemplary embodiments of the invention, path searcher 200 (FIG. 2A) may receive an input of m, for example, 18, received signals, defining PDP 502. According to these embodiments, up-sampler 206 (FIG. 2A) may have an up-sampling factor of 1, i.e., there may be no up-sampling, such that n equals m. As shown in FIG. 5, a first SN Kaiser value, e.g. value 504, corresponding to sample number 14, may be lower than a second SN Kaiser value, e.g., value 506, corresponding to sample number 16, although a first local peak of PDP 502, e.g. peak 503, corresponding to sample number 14, is higher than a second local peak of PDP 502, e.g., peak 505, corresponding to sample number 16. Thus, applying the SN Kaiser operator to the samples of FIG. 5 may yield an inaccurate result. It will be appreciated that the occurrence of such inaccuracy may depend on the variation of the slope of the PDP, e.g., the slope of PDP 502 may change within the narrow range including a relatively small number of samples, e.g. one sample. It will also be appreciated that the likelihood of such error may be dependent on the sampling resolution, e.g., a sub-chip level resolution, for example, the error resulting from the relatively low chip-level resolution of the samples of PDP 502. According to some embodiments of the invention, the received signals may be up-sampled, as described herein, in order to avoid variation of the PDP slope and in order to achieve a desired sampling resolution.

Figure 6:
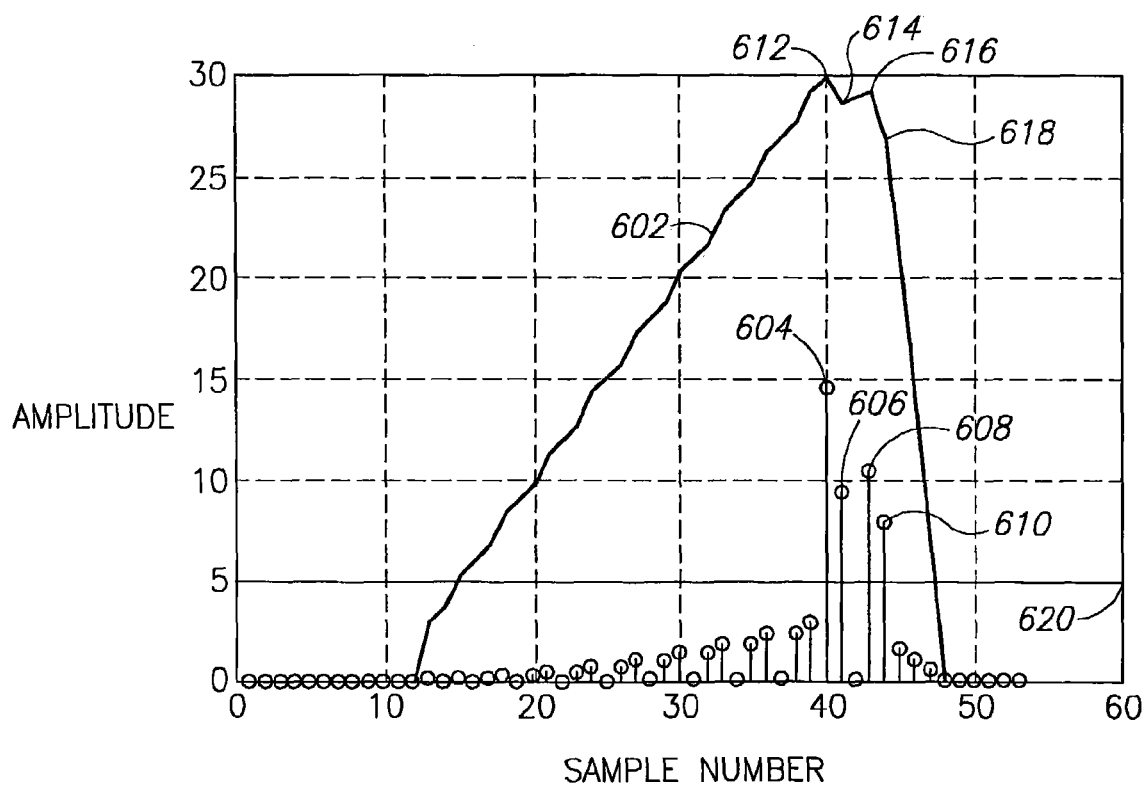
FIG. 6 is a schematic illustration of a graph depicting amplitude of an up-sampled PDP and values of a SN Kaiser operator as a function of sample number, respectively, in accordance with an exemplary embodiment of the invention.

Reference is also made to FIG. 6, which schematically illustrates a graph depicting amplitude of a PDP 602 and values of a SN Kaiser operator as a function of signal sample number, respectively, in accordance with further exemplary embodiments of the invention.

According to some exemplary embodiments of the invention, path searcher 200 (FIG. 2A) may receive input signals substantially similar to the input signals of FIG. 5, for example, an input including 18 received signals. According to these embodiments, up-sampler 206 (FIG. 2A) may have an up-sampling factor of three, i.e., interpolation may be applied to provide 54 samples, as described above.

As shown in FIG. 6, the up-sampling may provide a higher sub-chip level resolution of the PDP, e.g., PDP 602 may include local peaks 614 and 616 that are not included in PDP 502 due to its lower resolution. PDP 602 may have a sub-chip level resolution of $T_c/8$, in comparison to a sub-chip level resolution of $T_c/2$ for an un-sampled PDP, e.g., PDP 501 (FIG. 5). This higher resolution may provide more accurate SN operator outputs, e.g. outputs 604, 606, 608 and 610, respectively, corresponding to respective local peaks of the PDP, e.g., peaks 612, 614, 616 and 618, respectively. It may be noted that the amplitudes of outputs 604, 606, 608 and 610 may be proportional to the amplitudes of peaks 612, 614, 616 and 618, respectively. Thus, four dominant paths may be selected, e.g., corresponding to samples 40, 41, 43 and 44, respectively, as described above. It may be noted that the position of the dominant paths is not shifted relative to the sample number, i.e., the SN operator values representing the dominant paths may correspond to the same sample numbers of the dominant paths. Thus, according to this exemplary embodiment, the dominant path information may include four dominant paths, with respective path delays of 40, 41, 43 and 44, and with respective path amplitudes of 15, 9, 11, 8.

According to some embodiments of the invention, up-sampler 206 (FIG. 2A) may provide a desired higher sub-chip level resolution, as described above. This may obviate the need to use a Delay Locked Loop (DLL) for synchronization of the rake fingers of Rake receiver 200 (FIG. 2A), as is required in conventional methods and devices.

It will be appreciated by persons skilled in the art that the dominant path information provided by path searcher 200 (FIG. 2A) is significantly more accurate than the dominant path information that may be provided by prior art path searchers under comparable operational conditions. Furthermore, path searcher 200 (FIG. 2A) may have a significantly simpler hardware implementation compared to prior art path searchers. For example, a path searcher according to exemplary embodiments of the present invention, e.g., a device based on path searcher 200 (FIG. 2), may provide a resolution of $T_c/2^f$ and obviates the need to implement or use a DLL. This is in contrast to prior art path searchers that require the use of a DLL to provide comparable sub-chip level resolution.

Figure 7:
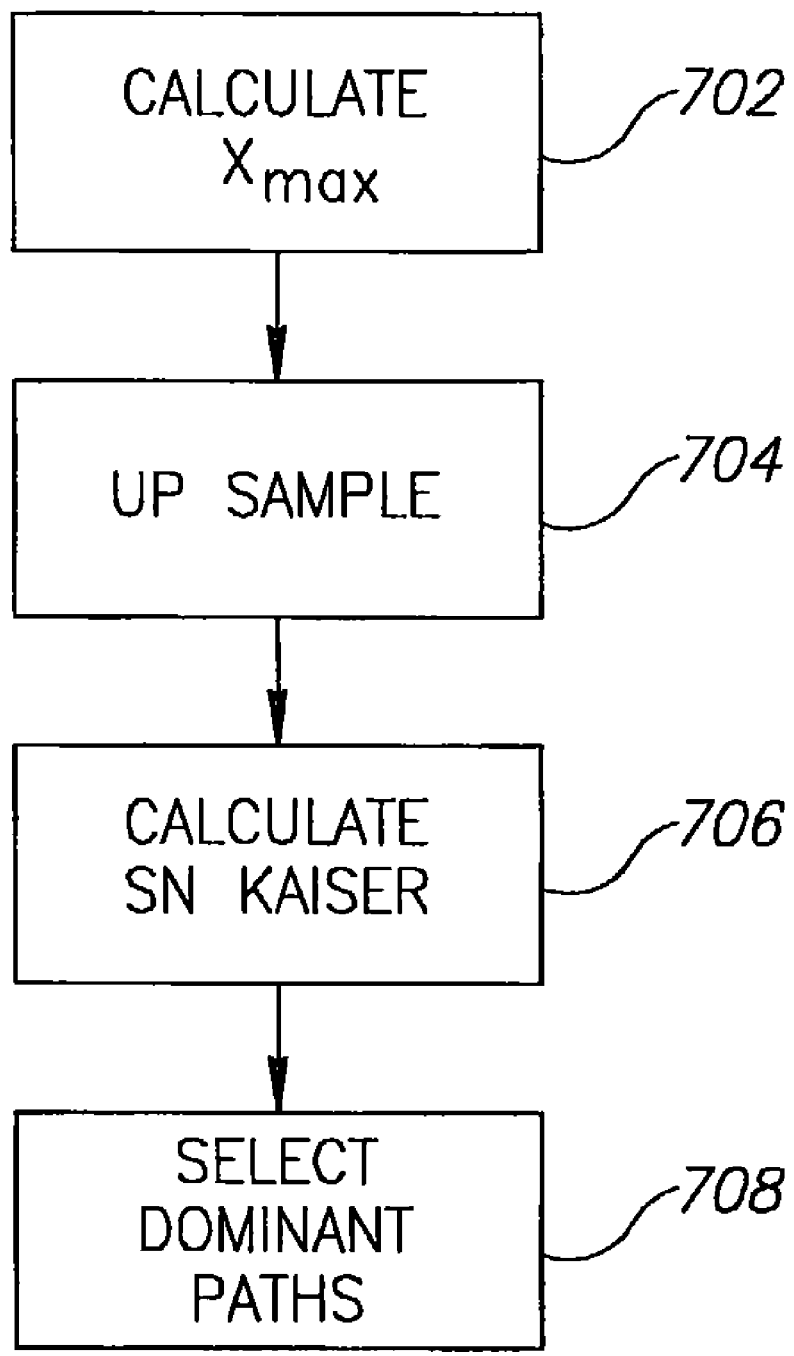
FIG. 7 is a schematic block diagram of a method of selecting dominant paths in accordance with some exemplary embodiments of the invention.

FIG. 7 schematically illustrates a block-diagram of a method of selecting dominant paths in accordance with some exemplary embodiments of the invention.

The method may begin with calculating maximal value $x_{max}$, for received signals x(m), as indicated at block 702.

The method may also include up-sampling the received signals, e.g., by up-sampling factor f, to provide a sample set of signal samples, as indicated at block 704.

The method may also include computing operator values, e.g. SN Kaiser values, corresponding to the signal sample, as indicated at block 706.

Finally, as indicated at block 708, the method may include selecting dominant paths according to the operator values computed at block 706.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
   a computing unit to compute a set of slope-normalized operator values corresponding to a set of respective signal samples, wherein said set of slope-normalized operator values are calculated using an operator multiplied by a slope-normalizing factor which is calculated using a maximum value of said signal samples.

2. The apparatus of claim 1 wherein said set of slope-normalized operator values comprises slope-normalized Kaiser operator values.

3. The apparatus of claim 1 wherein one or more of said set of slope-normalized operator values are substantially independent of a relationship between values of a corresponding pair of signal samples in said set of signal samples.

4. The apparatus of claim 1 wherein said set of slope-normalized operator values is generally proportional to the amplitude of said set of signal samples, respectively.

5. The apparatus of claim 1 comprising an up-sampler to calculate values of said set of signal samples based on a set of received signals.

6. The apparatus of claim 5 wherein said up-sampler comprises an interpolator.

7. The apparatus of claim 5 wherein said set of signal samples has a sampling resolution equal to at least the sampling resolution of said set of received signals.

8. The apparatus of claim 1 comprising a signal value detector to detect a maximum value of said received signals.

9. The apparatus of claim 8, wherein said slope-normalizing factor, $SN_{factor}$, is calculated according to the following equation:

$$SN_{factor} = \frac{|x(n)|/|x_{\max}|}{\sqrt{\mathrm{abs}(|x(n-1)| - |x(n+1)|)}}$$

wherein n is the number of values in said set of operator values and in said set of signal samples, wherein x(n) denotes the value of said signal samples, and wherein $x_{max}$ denotes said maximum value.

10. The apparatus of claim 9 wherein at least some of said n signal sample values are complex values, and wherein said set of slope-normalized operator values comprises slope-normalized Kaiser values calculated using the following algorithm:

if $(|x(n-1)|-|x(n+1)|)=0$ $\psi(n)=((|x_c(n)|/|x_{max}|))*[x_c(n)*x(n)-\frac{1}{2}[x_c(n+1)*x(n-1)+ x(n+1)*x(n-1)]]$ else $\psi(n)=SN_{factor}*[x_c(n)*x(n)-\frac{1}{2}[x_c(n+1)*x(n-1)+x(n+1) *x_c(n-1)]]]$ wherein $\psi(n)$ denotes the slope-normalized Kaiser value corresponding to x(n), and wherein $x_c(n)$ denotes the complex component of x(n).

11. The apparatus of claim 1 comprising a path selector to select one or more dominant paths corresponding to one or more of said set of slope-normalized operator values, respectively.

12. An apparatus comprising:
   a computing unit to compute a set of slope-normalized operator values corresponding to a set of respective signal samples; and
   a path selector to select one or more dominant paths corresponding to one or more of said set of slope-normalized operator values, respectively,
wherein said path selector provides information associated with said one or more dominant path, and wherein said information comprises at least one type of information selected from the group consisting of a relative path delay, a relative path amplitude and a number of paths.

13. A wireless communications device comprising:
   a Global System for Mobile-communications transceiver able to send and receive signals; and
   a computing unit to compute a set of slope-normalized operator values corresponding to a set of respective signal samples, wherein said set of slope-normalized operator values are calculated using an operator multiplied by a slope-normalizing factor which is calculated using a maximum value of said signal samples.

14. The wireless communications device of claim 13 wherein said set of slope-normalized operator values comprises slope-normalized Kaiser operator values.

15. The wireless communications device of claim 14 wherein one or more of said set of slope-normalized operator values are substantially independent of a relationship between values of a corresponding pair of signal samples in said set of signal samples.

16. The wireless communications device of claim 14 wherein said set of slope-normalized operator values is generally proportional to the amplitude of said set of signal samples, respectively.

17. The wireless communications device of claim 14 comprising an up-sampler to calculate values of said set of signal samples based on a set of received signals.

18. The wireless communications device of claim 17 wherein said up-sampler comprises an interpolator.

19. The wireless communications device of claim 14 comprising a signal value detector to detect a maximum value of said received signals.

20. The wireless communications device of claim 14 comprising a path selector to select one or more dominant paths corresponding to one or more of said set of slope-normalized operator values, respectively.

21. A method comprising:
  computing a set of slope-normalized operator values corresponding to a set of signal samples;
  selecting one or more dominant paths corresponding to one or more of said set of slope-normalized operator values, respectively; and
  providing information associated with said one or more dominant path, wherein said information comprises at least one type of information selected from the group consisting of a relative path delay, a relative path amplitude and a number of paths.

22. The method of claim 21 wherein said set of slope-normalized operator values comprises slope-normalized Kaiser operator values.

23. The method of claim 22 wherein one or more of said set of slope-normalized operator values are substantially independent of a relationship between sample values of a corresponding pair of signal samples in said set of signal samples.

24. The method of claim 22 wherein said slope-normalized operator values are generally proportional to the amplitude of said set of signal samples, respectively.

25. The method of claim 22 comprising up-sampling a set of received signals to provide said set of signal samples.

26. The method of claim 25 wherein said set of signal samples has a sampling resolution equal to at least the sampling resolution of said set of received signals.

27. The method of claim 25 comprising detecting a maximum value of said received signals, wherein computing slope-normalized operator values comprises computing said slope-normalized operator values using said maximum value.

28. An article comprising a storage medium having stored thereon instructions that, when executed by a processing platform, result in:
  computing a set of slope-normalized operator values corresponding to a set of signal samples;
  selecting one or more dominant paths corresponding to one or more of said set of slope-normalized operator values, respectively; and
  providing information associated with said one or more dominant path, wherein said information comprises at least one type of information selected from the group consisting of a relative path delay, a relative path amplitude and a number of paths.

29. The article claim 28 wherein said set of slope-normalized operator values comprises slope-normalized Kaiser operator values.

30. The article claim 28 wherein one or more of said set of slope-normalized operator values are substantially independent of a relationship between sample values of a corresponding pair of signal samples in said set of signal samples.

31. The article of claim 28 wherein said slope-normalized operator values are generally proportional to the amplitude of said set of signal samples, respectively.

32. The article of claim 28 wherein said instructions result in up-sampling a set of received signals to provide said set of signal samples.

33. The article of claim 32 wherein said instructions result in detecting a maximum value of said received signals, wherein computing slope-normalized operator values comprises computing said slope-normalized operator values using said maximum value.

34. A communication system comprising:
  a first communication device to transmit a signal through a communication channel; and
  a second communication device to receive said signal, said second communication device comprising a computing unit to compute a set of slope-normalized operator values corresponding to a set of respective signal samples, wherein said set of slope-normalized operator values are calculated using an operator multiplied by a slope-normalizing factor which is calculated using a maximum value of said signal samples.

35. The communication system of claim 34 wherein said set of slope-normalized operator values comprises slope-normalized Kaiser operator values.

36. The communication system of claim 34 wherein one or more of said set of slope-normalized operator values is substantially independent of a relationship between values of a corresponding pair of signal samples in said set of signal samples.

37. The communication system of claim 34 wherein said set of slope-normalized operator values is generally proportional to the amplitude of said set of signal samples, respectively.

38. The communication system of claim 34 wherein said second communication device comprises an up-sampler to calculate values of said set of signal samples based on a set of received signals.

39. The communication system of claim 34 wherein said second communication device comprises a signal value detector to detect a maximum value of said received signals.

40. The communication system of claim 34 wherein said second communication device comprises a path selector to select one or more dominant paths corresponding to one or more of said set of slope-normalized operator values, respectively.

* * * * *